United States Patent [19]

Kieft et al.

[11] 4,097,442
[45] Jun. 27, 1978

[54] SANDABLE POLYURETHANE ADHESIVE COMPOSITION AND LAMINATES MADE THEREWITH

[75] Inventors: Alvin J. Kieft; Richard L. Cline; Thomas G. Rabito, all of Ashland, Ohio

[73] Assignee: The Goodyear Tire & Rubber Company, Akron, Ohio

[21] Appl. No.: 835,258

[22] Filed: Sep. 21, 1977

[51] Int. Cl.$^2$ ............................................. C08L 75/08
[52] U.S. Cl. .............................. 260/37 N; 260/2.5 AK
[58] Field of Search .................. 260/37 N, 2.5 AK; 428/293, 424

[56] References Cited

U.S. PATENT DOCUMENTS

| | | | |
|---|---|---|---|
| 3,607,825 | 9/1971 | Shannon | 260/37 N |
| 3,824,201 | 7/1974 | McGranaghan et al. | 260/37 N |

*Primary Examiner*—Lewis T. Jacobs
*Attorney, Agent, or Firm*—J. D. Wolfe

[57] ABSTRACT

A polyurethane adhesive that is sandable when cured, the adhesive being the reaction product of a mixture of about one mol of a polyester polyol or polyether polyol of 2-4 hydroxyls having a molecular weight of 500 to about 3000 and 2.5 to 7 mols of isocyanate composition of a mixture of toluene diisocyanate and methane di(phenyl isocyanate) containing a filler composed of silica platelets and glass spherical platelets, a plasticizer amount of polyvinyl chloride plasticizer and a curative amount of monomeric nitrogen containing tetraol of 200 to 1000 molecular weight.

4 Claims, No Drawings

SANDABLE POLYURETHANE ADHESIVE COMPOSITION AND LAMINATES MADE THEREWITH

This invention relates to a sandable polyurethane composition per se or its precursor as an adhesive. More specifically, this invention relates to polyurethane compositions useful for adhering polyester coated fiberglass panels together to form laminated bodies and to said laminates which are sandable to give a smooth joint.

Although polyester impregnated fiberglass vehicular bodies and boats have been made for some time by cementing the parts together, into the desired assembly, the resulting assembly frequently had unsightly joints or seam lines which were objectionable. For instance, the seam where two pieces of polyester sheet were bonded would shrink and the seam line would be readily noticeable even when painted. Therefore, it has been desirable to provide an adhesive that could be sanded to give a smooth finish and be painted without the seam line appearing through the paint coating, as is experienced with the isocyanate type adhesive of U.S. Pat. Nos. 3,935,051 and 3,812,003.

It is an object of this invention to provide an adhesive which may be used to adhere polyester impregnated fiberglass parts and other materials together andtthe cured adhesive can be sanded to give a joint which does not exhibit the seam line after it is painted.

This and other objects and advantages may be obtained by forming a reaction mixture comprising (a) about one mol of a reactive hydrogen containing polymeric material having a molecular weight of about 500 to 3000 and preferably from about 800 to 2200 selected from the class consisting of polyester polyols and polyether polyols, (b) about 2.5 to seven mols and preferably 3.5 to five mols of a blend of organic polyisocyanates consisting of toluene diisocyanate (TDI), methane diphenyl isocyanate (MDI) and quasiprepolymers of MDI, (c) a filler composed of at least 50 parts to about 200 parts of silica composed of platelets, 50 to 200 parts of fine spherical particles of glass, a tertiary amine catalyst and a plasticizer, and (d) sufficient monomeric nitrogen containing tetraol of 200 to 1000 molecular weight to be equivalent to 50 percent of the excess polyisocyanate relative to the reactive hydrogen containing polymeric material but preferably 0.5 to 1.0 mol for each one to two mols of excess of the polyisocyanate.

Two pieces of polyester fiberglass mats or other building materials can be cemented together by spreading the above reaction mixture over at least one of the surfaces to be adhered and then pressing the two surfaces together until the reaction mixture has set and cured. Then the excess adhesive can be sanded away to give a joint which can be painted and the joint line does not show through the paint coating.

The nature of this invention may be further appreciated from the following illustrative an representative examples wherein all parts and percentages are by weight unless otherwise indicated.

EXAMPLE I

The adhesive composition was made by mixing composition A and composition B. Composition A was made by placing 73.5 parts of polypropylene ether glycol of 1000 molecular weight in an inert atmosphere jacketable reactor together with 16 parts of dioctylphthalate, 100 parts of silica essentially of the platelet type that passed 200 Mesh Taylor Sieve but stopped on 325 Mesh sieve and 100 parts of fine spherical particles of glass that passed a 200 Mesh Taylor sieve but stopped on a 325 Mesh sieve and then the mixture was dehydrated at elevated temperature under a vacuum. To the dehydrated mixture 125.5 parts of a mixture of 48 parts of Mondur PF, the tradename of Mobay Chemical Company for a quasiprepolymer of MDI and dipropylene glycol, 35 parts of 80/20 isomeric toluene diisocyanate and 42.5 parts of methane di(phenyl isocyanate) referred to herein as MDI, was added to the reactor and reacted to form a prepolymer.

Composition B was made by mixing 85 parts of silica of platelet type indicated above in regard to composition A, 16 parts of fine spherical particles of glass of the type indicated above in regard to composition A, 50 parts of a polyol formed by condensing sufficient propylene oxide on an alkylene diamine to give a polyol having a molecular weight of 250 to 1000, 50 parts polyoxyalkylene tetraol of 500 molecular weight and 0.2 parts of a triethylene diamine as a catalyst.

Composition A (415.0 parts) and Composition B (201.2 parts) were mixed immediately before use to form an isocyanate class adhesive.

This isocyanate class adhesive was used to form a fiberglass polyester laminate that could be sanded and painted without a bond line showing through the paint.

The lamination operation can be performed in any of the well-known manners using the isocyanate adhesive of this invention. Where butt joints are to be formed, it is preferred to grind or sand away the ends of specimens to be butt spliced to give a 45° angle to each end of the specimen. Then the specimen are placed in a bonding buck or clamp, preferably with 0.090 inch spacing between the ends to be bonded. The space between the ends of polyester fiberglass mat is filled with the adhesive and it is allowed to cure at room or at elevated temperature. The excessive adhesive is sanded away after the adhesive is fully cured to give a smooth finish to the two joined specimens. When the sanded smooth butt joined specimens are spray painted, the paint coat cures with no evidence of seam line being apparent through the paint coat as is experienced with the usual commercial adhesives.

The adhesive of this example was used to lap bond a number of low profile FRP sheets (a polyester fiberglass sheet) to itself and to a steel specimen. The overlap sheer strength, expressed in pounds per square inch (psi) of these specimen are shown in Table 1. Two pieces of steel which were lap bonded with this adhesive had a room temperature overlap sheer strength of 3,050 psi, and bond failure was by cohesion.

Table 1

| Test Conditions | Low Profile FRP to itself | Low Profile FRP to steel |
| --- | --- | --- |
| −40° F. test | 896 delam[1] | 826 coh/FT[2] |
| Room temperature test | 876 delam | 904 coh/FT |
| 180° F. test | 532 delam | 680 coh/FT |
| After initial cure followed by: | | |
| 14 days at 180° F. | 812 delam | 906 coh/delam |
| 14 days at 100° F./ 100% R H | 872 delam | 910 coh/FT |
| 240 hour salt spray | — | 904 coh/FT |
| 14 day water immersion | 836 delam | 959 coh/FT |
| 500 hour weatherometer | 890 delam | — |
| Panel Flex Test (OCF[3]8° Flex-16° arc) | 6 million cycles | No cracks and |

Table 1-continued

| Test Conditions | Low Profile FRP to itself | Low Profile FRP to steel |
|---|---|---|
| | | no failures. |

[1] The term "delam" means the laminate failed due to delamination of the specimen. COH means cohesive failure of the adhesive bond.
[2] FT means the adhesive bond failed by tearing the fiber, i.e. the polyester fiberglass.
[3] OCF is the abbreviation for an Owens Corning Flex Test Machine and 8° Flex - 16° arc indicates machine test condition.

In the above example the 16 parts of silica platelets in composition B can be replaced with 16 parts of aluminum powder of platelet type to give an adhesive that yields a cured polyurethane that is readily sandable and has improved heat dissipating properties as well as improved cosmetic appearance.

It is preferred to include sufficient plasticizer of the well-known type useful to commercially plasticize polyvinyl chloride resins to give the cured adhesive an elongation of 10 percent to about 20 percent or more so the laminate cam be flexed. The more common commercial PVC plasticizers are soya oils and the esters of the phthalates, azelates, sebacates and phosphates of the alcohols of about 4 to 20 carbon atoms. Usually 5 to 25 percent by weight of plasticizer based on the polyether or polyester such as those of U.S. Pat. Nos. 3,935,051 and 3,812,003 is sufficient to give the desired percent elongation to the cured polyurethane.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane adhesive that is sandable when cured, comprising a reaction mixture of
   (a) about one mol of a reactive hydrogen containing polymeric material of 500 to about 3000 molecular weight selected from the class of polyester polyols and polyether polyols of 2 to 4 hydroxyls;
   (b) about 2.5 to 7 mols of an isocyanate composition comprised of a mixture of toluene diisocyanate and methane di(phenylisocyanate); and
   (c) a filler composed of about 50 to 200 parts by weight of silica platelets and about 50 to 200 parts of glass spherical particles, a plasticizer amount of a polyvinyl chloride plasticizer, a polyurethane catalyst and sufficient monomeric nitrogen containing tetraol of 200 to 1000 molecular weight to provide 0.5 to 1.0 mol of curative for each mol of excess isocyanate.

2. The adhesive of claim 1 wherein the polyether polyol is a polypropylene ether glycol.

3. The adhesive of claim 1 wherein the methane di(phenylisocyanate) constitutes 20 to 35 mols percent of the isocyanate composition.

4. The adhesive of claim 1 wherein a major portion of the MDI content of the isocyanate composition is from a quasi prepolymer of MDI.

* * * * *